No. 894,880.

PATENTED AUG. 4, 1908.

O. J. GARLOCK.
ROD PACKING.
APPLICATION FILED MAY 6, 1908.

2 SHEETS—SHEET 1.

Witnesses
L. P. Armstrong
A. M. Whitmore.

Inventor
Olin J. Garlock,
By Enos B. Whitmore,
Attorney

No. 894,880. PATENTED AUG. 4, 1908.
O. J. GARLOCK.
ROD PACKING.
APPLICATION FILED MAY 6, 1908.

2 SHEETS—SHEET 2.

Witnesses
R. L. Armstrong.
A. M. Whitmore.

Inventor
Olin J. Garlock,
By Enos B. Whitmore,
Attorney

UNITED STATES PATENT OFFICE.

OLIN J. GARLOCK, OF PALMYRA, NEW YORK, ASSIGNOR TO THE GARLOCK PACKING COMPANY, OF PALMYRA, NEW YORK.

ROD-PACKING.

No. 894,880.         Specification of Letters Patent.         Patented Aug. 4, 1908.

Application filed May 6, 1908. Serial No. 431,151.

*To all whom it may concern:*

Be it known that I, OLIN J. GARLOCK, of Palmyra, in the county of Wayne and State of New York, have invented a new and useful Improvement in Rod-Packing, which improvement is fully set forth in the following specification and shown in the accompanying drawings.

This invention relates to certain new and useful improvements in ring packing for piston and pump rods, and it has for its objects among others to provide a simple and efficient packing constructed for hydraulic work, having a metal member to take the wear, and the packing being such as to be best adapted for work of that character where in making the pump cylinders it is desirable to make the stuffing box at the end of the cylinder short and shallow so as not to project too far from the end of the cylinder, the packing being such that a few rings are sufficient to perfectly pack the rod and keep the joint around it tight and prevent the escape of the water. The present improvement is applicable to rings whether the wear comes on the outer or the inner periphery or circumference. The metal ring is of substantially V-shape and its inclined sides are embedded in the body portion of the packing ring, which is made of suitable material, as layers of fiber as cotton duck or other analogous substance alternated with layers of india rubber, both faces of which are preferably faced with rubber. In all instances the metal member or ring has its ends slightly apart to provide for expansion, the cut being practically straight across, and in the case of a ring adapted for rods the body portion is cut across diagonally. In the form designed for piston heads or plungers the body is not cut as there is no occasion therefor, these rings being used to suck or pump water. The metal strand is cut across so as to allow it to expand or be expanded to press the inner surface of the cylinder.

Other objects and advantages of the invention will hereinafter appear and the novel features thereof will be specifically defined by the appended claims.

Figure 1:
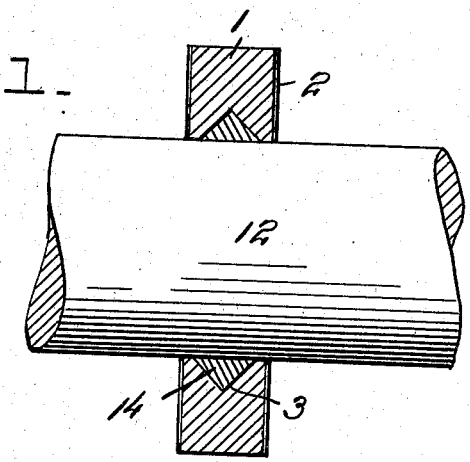
Figure 2:
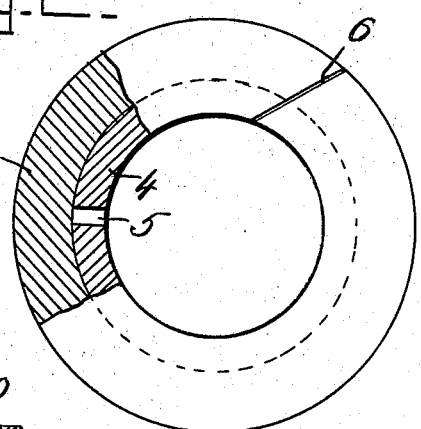
Figure 3:
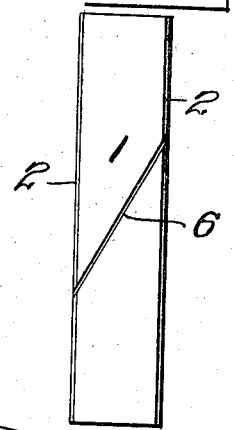
Figure 4:
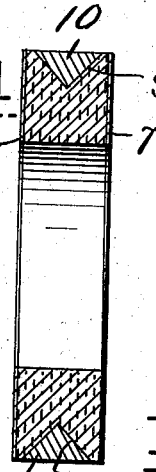
Figure 5:
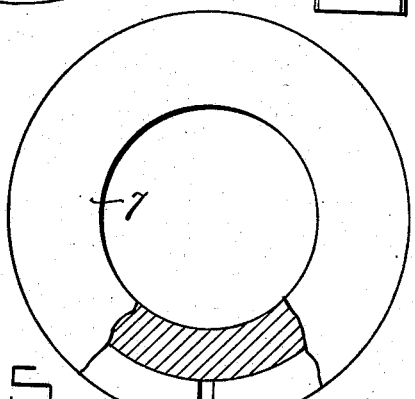
Figure 6:
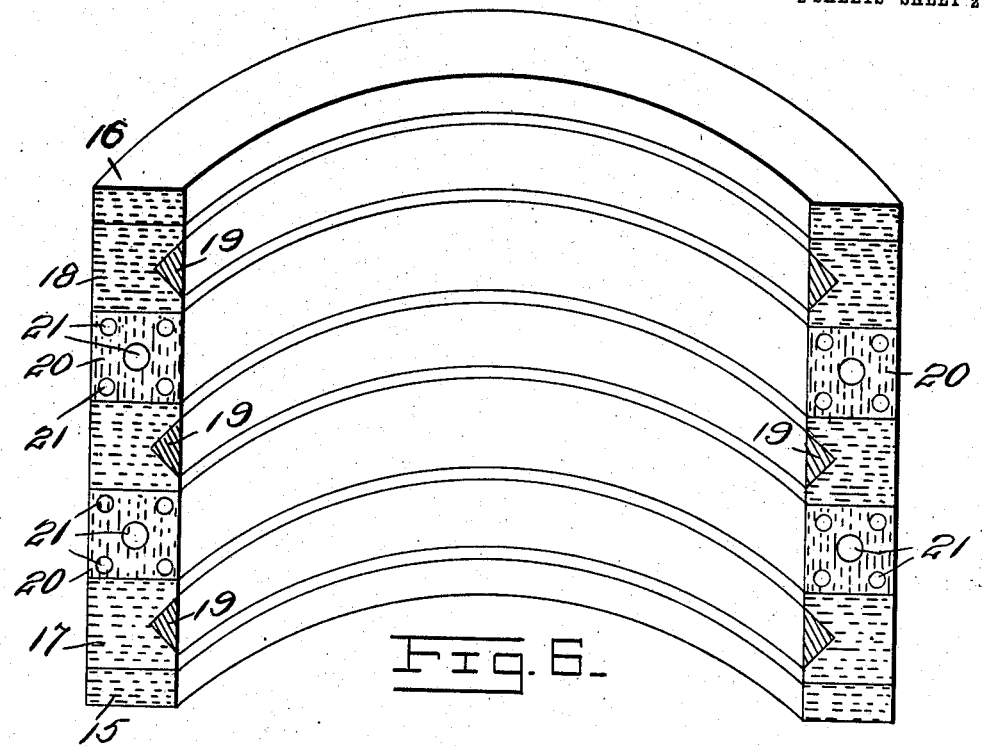
Figure 7:
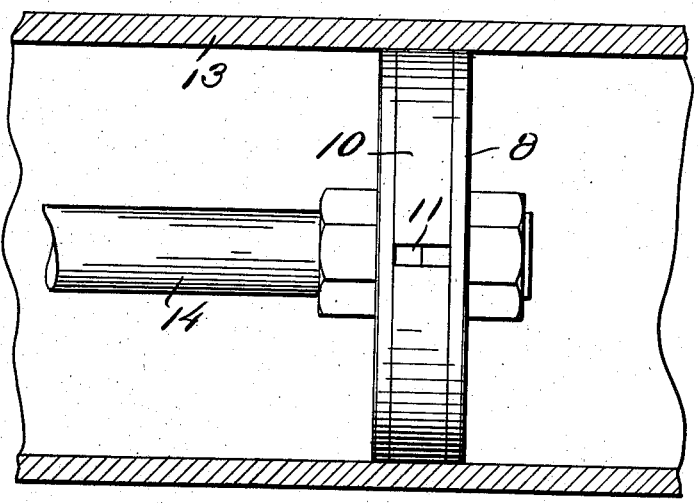

The invention in its various forms, is clearly illustrated in the accompanying drawings, which, with the numerals of reference marked thereon, form a part of this specification, and in which Figure 1 is a view showing the piston rod in elevation and in substantially central section showing one form of my improved packing ring applied thereto. Fig. 2 is a face view, with a portion broken away and parts in section, of the form of ring shown in Fig. 1. Fig. 3 is an edge view of Fig. 2. Fig. 4 is a view, similar to Fig. 2, showing a ring with the metal member on the outside. Fig. 5 is an end view of Fig. 4, with parts broken away. Fig. 6 is a section through a packing composed of a multiplicity of rings, each alternate ring having a metal member, this form of packing being designed for rods or the like of large diameter. Fig. 7 is a view showing the application of the form of ring shown in Fig. 4 to a cylinder or pump barrel.

Like numerals of reference indicate like parts in the different views.

Referring to the drawings attention is directed first to Figs. 1, 2 and 3, in which 1 designates the body portion of the ring, which is formed of layers of fibrous material, as cotton duck or the like, and layers of india rubber alternated therwith, this material being similar to that employed in packings of this nature, the opposite faces of the ring being faced with rubber as shown at 2. The inner circumference of this body is formed with a surrounding depression or recess 3 which is shown as substantially V-shaped, and within this depression or recess is adapted to be received the ring 4 preferably of lead and of substantially V-shape in cross section as seen best in Fig. 1. This lead member or ring has its ends separated as seen at 5 so as to allow for expansion in use. In this form the body portion 1 is cut diagonally across, as seen at 6, so that the said body may be expanded by the expansion of the lead ring. A packing ring thus constructed, with the lead member on the inside is designed for rods and may be made of any required diameter, in sizes from a few inches to several feet. Any number of rings may be employed, but the nature of my improved packing is such that a minimum number of rings is sufficient to insure a tight joint. The lead member receives the abrasion or wear, as it does also in the form now to be described which is designed for cylinders, the lead member being on the outside so as to receive the wear or abrasion as will be clearly understood from reference to Figs. 4, 5 and 7 to which attention is now directed. In the form shown in these views the body portion 7 is composed of alternated layers of fiber, as cotton duck or the like, and india rubber and faced upon opposite sides with rubber, as seen at 8. The body portion is formed about its outer periphery or circumference with a substantially V-shaped depression, groove or recess 9 to receive the V-shaped member 10 preferably of lead. The ends of this lead member or ring 10 are separated or spaced apart, as shown at 11, to allow for expansion. In this form the fibrous and rubber body 8 is not provided with a diagonal or other cut as there is no occasion for the same, this form of packing ring being designed for piston heads or plungers and used for sucking or pumping water. The lead member is cut across or separated so as to expand or be expanded to press the inner surface of the cylinder.

In Fig. 1, 12 designates the piston rod while in Fig. 7 13 designates the cylinder or pump barrel and 14 the plunger rod, it being understood that these parts are of ordinary construction.

In Fig. 6 I have shown a packing ring of large diameter having embodied therein rings of the character shown in Figs. 1, 2 and 3. In this form the end rings 15 and 16 are thin rings of alternated layers of fibrous material and india rubber, next adjacent which are the rings 17 and 18 respectively which are similar to those shown in Fig. 1, 19 being the lead members or rings on the inner surfaces thereof, and between these rings are the rings 20, the body portion of which is of rubber having embedded therein the annular disposed metal rods or the like 21. This forms a most efficient form of packing ring for heavy hydraulic work, it being understood that any number of the alternately disposed rings may be employed, according to the desired length of the completed packing rings.

It is to be understood that the different forms of rings hereinbefore described are for either hot or cold water; it is also evident that various modifications in the details may be resorted to without departing from the spirit of the invention or sacrificing any of its advantages.

What is claimed as new is:—

1. A packing ring comprising a body portion of alternate layers of rubber and fibrous material having a surrounding substantially V-shaped recess and facings of rubber upon opposite sides, and a ring of lead substantially V-shaped in cross section loosely seated in said recess and having its ends spaced apart to allow for expansion.

2. A packing ring composed of end rings, rings adjacent the same and composed of a body portion of fiber and rubber and a lead ring loosely seated therein with its acting face disposed to receive the wear and abrasion in use, and a ring of rubber interposed between the rings having the lead rings.

3. A packing ring composed of end rings, rings adjacent the same and each having a lead ring upon its acting face with the ends separated and loosely seated in the body portions of said rings, and rings of fiber and rubber with reinforces embedded therein and interposed between the rings having the lead rings.

In witness whereof, I have hereunto set my hand this 30 day of April, 1908, in the presence of two subscribing witnesses.

OLIN J. GARLOCK.

Witnesses:
 GEO. E. BERNHARD,
 WINSTON J. LEACH.